(No Model.)
R. M. HUNTER.
ELECTRIC RAILWAY.
No. 555,509. Patented Mar. 3, 1896.
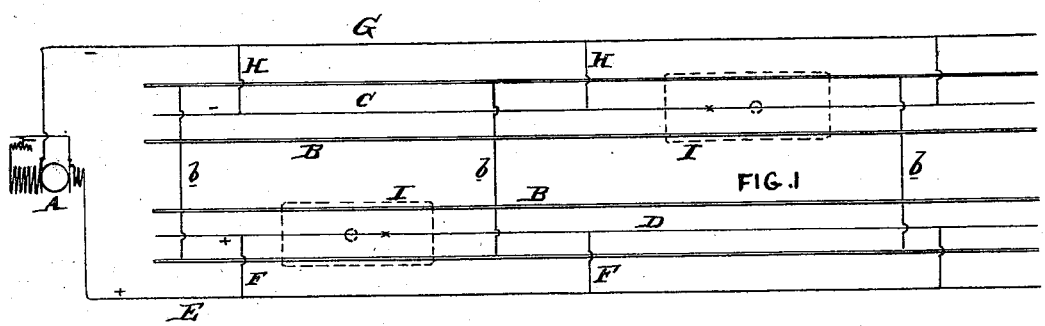
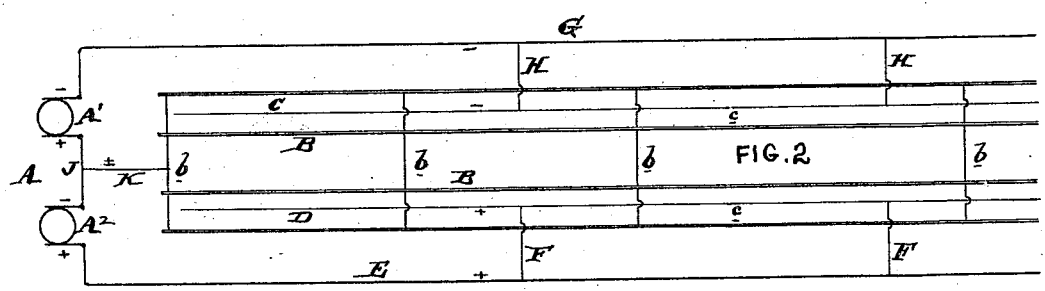
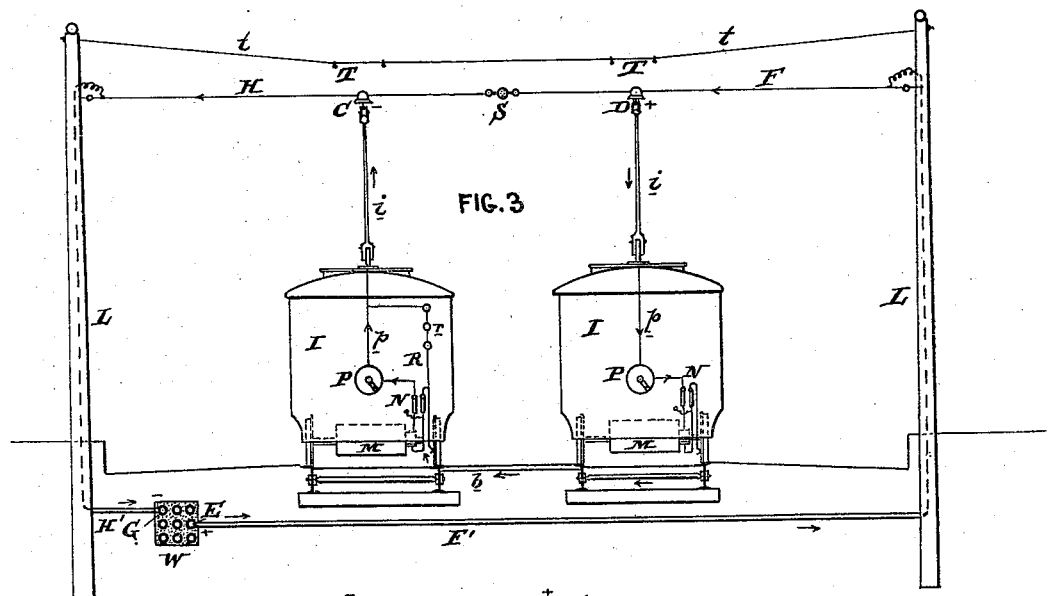
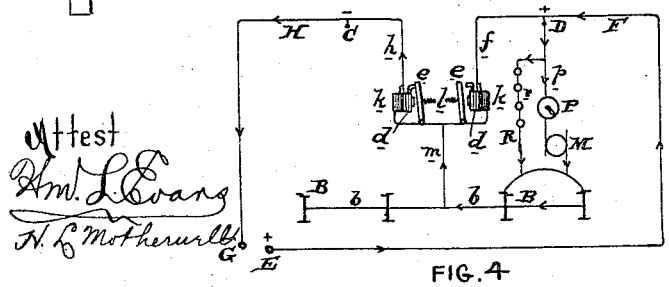
Attest
Wm. L. Evans
N. L. Motherwell
Inventor

UNITED STATES PATENT OFFICE.

RUDOLPH M. HUNTER, OF PHILADELPHIA, PENNSYLVANIA, ASSIGNOR TO THE GENERAL ELECTRIC COMPANY, OF NEW YORK.

ELECTRIC RAILWAY.

SPECIFICATION forming part of Letters Patent No. 555,509, dated March 3, 1896.

Application filed June 21, 1894. Serial No. 515,287. (No model.)

*To all whom it may concern:*

Be it known that I, RUDOLPH M. HUNTER, of the city and county of Philadelphia and State of Pennsylvania, have invented an Improvement in Electric Railways, of which the following is a specification.

My invention has reference to electric railways; and it consists of certain improvements which are fully set forth in the following specification and shown in the accompanying drawings, which form a part thereof.

This application (Case No. 280) has special reference to a system of operating electric railways wherein there are two or more parallel tracks adapted to receive current from stationary source or sources of supply.

It is well known that in systems of electric traction wherein current is supplied to traveling cars by means of line conductors extending along the railway in which the rails act as one of the conductors, and usually the return circuit, there are produced very injurious effects to the water and gas mains arranged in the streets parallel and close to the said railways. These effects may be stated as due to electrolytic action, and are produced by a portion of the current leaving the rails and returning to or toward the source of supply or central station through the water-pipes and gas-mains. This action takes place under well-known laws, since the current will find its return to the primary source through any conductors which may be in its path, and will divide over said conductors inversely to their ohmic resistances. The electrolytic action is more apparent at the joints of the pipes than at other places, and is due to the greater resistance of the pipes as a conducting medium at these points than at other places thereof. Furthermore, in the system as commonly employed, the electricity is required to pass parallel to the tracks in its return to the central station and is thus presented to the water-mains and gas-pipes in the most objectionable condition, since it is required to pass through each and every joint of the said pipes. In cases where a large number of cars are in operation, the amount of the return current is very great, and therefore has very strong electrolytic action.

My improvements have for their object the substantial elimination of the tracks and earth as the return conductor, and using the tracks essentially as a bridging media between the positive and return conductors of the electric railway or railways. There is a great objection to employing two suspended conductors for each track, owing to the necessity of employing two trolleys, and in view of the various difficulties which are incident thereto, and in the overhead-circuit structures at points of switching. My object is to avoid all of these complications and to make a system to all outward appearances substantially similar to what it is at the present time, employing but one suspended conductor for each track.

In carrying out my invention it is immaterial whether the parallel tracks are upon the same street or upon adjacent streets, though the best advantages will be attained when the tracks are upon the same street, as is customary in a large number of the electric railways in use at the present time. In my drawings, therefore, I have illustrated a number of the parallel tracks and shown them upon one street, for it is to be borne in mind that I do not confine myself to any particular arrangement so long as the tracks are at a convenient distance apart.

In the drawings, Figure 1 is a diagrammatic plan view illustrating an electric railway embodying my invention. Fig. 2 is a similar view of the same somewhat modified. Fig. 3 is a cross-section of my improved railway system, and Fig. 4 is a diagram illustrating the electric circuits thereof.

A is the generator or source of electrical supply, and may consist of dynamo-electric machines arranged at a central station at some convenient place along the railway, preferably in practice midway of its length.

B B represent two parallel railway-tracks having the rails so connected as to form good conductors, and these tracks are electrically connected by bridging-conductors *b* or in any suitable manner so that the current may pass readily from one track to the other.

C is a suspended conductor arranged over one of the tracks, and D is a suspended conductor arranged above the other track, the said conductors being similar in all material respects to the suspended conductors in general use. These suspended conductors may be connected to spanning wires F H, connected together at the center by an insulating-coupling and at their outer ends through suitable insulating connections with the poles L L, arranged upon opposite sides of the roadway. The suspended conductor D is thereby insulated from the suspended conductor C and acts as a positive conductor, while the suspended conductor C acts as the negative conductor. These conductors C D may be, respectively, connected with the terminals of the generator or to the bus-wires of the central station; or, if the system is of considerable size, said conductors may be connected at intervals by branching conductors with suitable supply-conductors, which latter may be suspended upon poles or arranged in conduits below the roadway.

E is a supply-conductor for the trolley-wire, and D is connected to it at intervals by the branch conductors F. G is a supply-conductor for the trolley-wire C, and is connected to it at intervals by the branch conductors H. Any suitable system of feeding or supply wires heretofore employed may be used with my improved system.

I represents the electric cars, and each of said cars is provided with the trolley $i$, one or more electric motors M, arranged to propel the car, (if desired a current-reversing switch N for reversing the direction of the motor,) and a controlling-switch P, of some suitable construction, for controlling the speed of the car.

It is totally immaterial to my invention what the particular construction of the car or method of regulation may be, as my improvements are adapted to any system heretofore employed. The motor-circuit on the car is shown at $p$, and R is a lighting-circuit in parallel with the motor and containing the electric lamps $r$ for lighting the car.

It will now be seen that the current passes through the supply-conductor E over the branch conductors F to the positive trolley-wire D, then descends through the trolley $i$ and operates the motors of the car I traveling beneath the trolley-wire D. The current passes from the motor to the rails and thence by cross-conductors $b$ to the rails of the other track and ascends through the motor-regulator and trolley to the nearest cars upon the other track and it is delivered to the negative conductor C of the other railway. It then passes by branching conductors H to the supply-conductor G, and finally back to the central station. In this manner it will be evident that the circuits in the ground will be limited to a small area and will be transversely to the direction or length of the water or gas pipes, thereby obviating the electrolytic action which formerly took place when the current was required to pass over said pipes for the full length of the railway.

In systems where a large number of cars are in operation, and especially where a series of branching roads terminate in one track, this system would be particularly advantageous, as the current would have to travel but a very short distance before finding egress to the return-conductor through other cars. It is well known that in places like Boston, New York, Philadelphia, Cincinnati, Chicago and other large cities there are portions of the track in which a number of cars are in circuit or in operation within each square, thus making it an easy matter for the current to find ready passage from one conductor, D, to the other conductor, C, without passing any material length longitudinally of the railways. In cases, however, where but few cars are run and where the distance between the several cars is in the most part liable to be great, unless some additional means is provided for permitting ready passage of the current from one trolley-wire to the other after energizing an electric motor or motors upon the car on one railway, the current will be required to pass for a considerable length parallel to the railway-tracks before finding a passage to the return-conductor. To overcome this tendency I may arrange at intervals along the railway automatic circuits, which latter connect the rail system with either of the trolley-wires or with the feeding-conductors of their branches. Such a device adapted to the purpose is illustrated in Fig. 4. The trolley-wires C and D are shown as arranged above the tracks B and are connected by the branch conductors H and F with the feeding-conductors G and D substantially in the circuits as shown in the other figures. The motor-circuit on the car is illustrated on the right hand of this figure.

The positive and negative conductors or trolley-wires are connected by circuits $h\ f$, containing two high-resistance coils $k\ k$. Each of these coils is provided with a core forming an electromagnet, and said coils are also wound with low-resistance coils $d\ d$, which are normally out of circuit. Each of these electromagnets is provided with an armature $e$, having a spring or suitable device $l$ for moving it away from the core to open the circuit through the low-resistance coils. The juncture of the two circuits $h\ f$ at a point intermediate of the electromagnets is connected by a circuit $m$ with the track-circuit $b\ b$. It will now be understood that normally an exceedingly small current is permitted to flow from the trolley-wire D or its feeder through both of the high-resistance magnet-coils $k$ to the trolley-wire C or its feeder G. When no car is near this cross-circuit, both of the armatures $e$ are open, so as to cut both of the low-resistance coils $d$ out of circuit, the adjustment of the spring $l$ being such that the high-resistance coils $k$ when in series with each other will not permit enough current to flow to attract the armatures. Assume, however, that a car passes within reasonable distance of these switches. We will have a large volume of current passing from the trolley-wire D to the rail-circuit B. This current passes by the circuit $m$ through the high-resistance coil $k$ in the circuit $h$, thus materially increasing its magnetism and attracting the armature, so as to close the circuit through the low-resistance magnet-coil $d$ corresponding to said armature. This is done automatically upon the approach of the car, so that the high-resistance coil is thoroughly protected against being burned out and an abnormal resistance to the current flowing through the car is avoided. In this manner the current may readily pass from the trolley-wire D to the rails and from the rails to the trolley-wire C without the necessity of a car being upon the other track or anywhere near the passing car. As the car passes to a considerable distance the current energizing it may pass to the trolley-wire C either through another car or through another of such switches, and as it recedes the current flowing in the low-resistance coil $d$ will become gradually less until the spring $l$ again becomes strong enough to pull the armature away from the core and the circuit is once more in its abnormal condition. This form of switch is given as an example of a suitable construction adapted to the above purpose; but it is to be borne in mind that these switches as a rule would be unnecessary, because in most cases the objects to be gained by the employment of this system would not be secured in those places where the cars were very far apart, for in such places the injuries to the water-pipes and gas-mains do not occur.

It is also evident that this system may be employed in connection with any of the ordinary systems now employed wherein the suspended conductor is of one polarity and the rails are of the other polarity and which act as a circuit leading from the central station.

An important advantage of my improved system is that there are no circuits on the ground which carry any material potential.

The feeding-conductors, when employed, are preferably arranged in a conduit $w$ of any suitable construction embedded in the roadway, as clearly indicated in Fig. 3. In this case the branching conductors H and F pass from the feeding-conductors G and E through suitable tubes or insulation H' and F', respectively, to conduct the said branch conductors to a suitable position either within the poles or otherwise, so as to properly connect with the branch wires H and F, which, as before stated, may be the spanning-wires. It is evident, however, that these supply-conductors G and E may be arranged upon poles or otherwise so long as they supply current to the positive and negative conductors C and D.

In Fig. 3, T T represent guard-wires running parallel to the trolley-wire and are suspended by transverse suspension-wires $t$ connected at each end of the upper part of the poles L, so that they are held above the trolley-wires to prevent any possibility of a falling wire completing a circuit across the positive and negative working conductors.

It is not essential to my invention that the positive and negative conductors D and C shall be continuous throughout their entire length, as they may be made in sections, as indicated in Fig. 2, the junction of two sections being illustrated at $c$. In this case each section may be supplied with current by independent feeding connections, and any section might be readily cut out without interfering with the remaining portion of the system. Furthermore, in the construction shown in Fig. 2 I have illustrated the primary generating source of power A as comprising two separate dynamo-electric machines A' A$^2$, connected in series across the supply-conductors E and G—that is to say, the positive terminal of the generator A$^2$ is connected with supply-conductor E leading to the positive trolley-wire D. The negative terminal of the generator A' is connected with the negative feeding-wire G, connecting with the negative trolley-wire C. The positive terminal of the generator A' is connected with the negative terminal of the generator A$^2$ by a conductor J. I may also connect the conductor J intermediate of the two generators with the rail-circuit by a conductor K, in this case for the purpose of more readily balancing the system. In this construction of electric railway set out in this application, the electric circuits are practically independent of the employment of the earth as a conductor, and therefore also overcome in a large part the tendency of electrolytic action on the water and gas pipes. Furthermore, as the currents which may traverse the rails in connection with the earth move transversely to the length of the pipes, which are always arranged longitudinally in the streets, the injurious effects of electrolytic action are also avoided, even where said currents may be required to pass transversely to said pipes.

I have shown in these various figures two parallel tracks such as may be arranged upon any street, and have shown poles upon each side of the street; but it is quite evident that in place of said side poles a center pole, with arms, may be employed, similar, for instance, to that set out in my Letters Patent No. 438,847, dated October 21, 1890, and which construction is extensively used in practice.

It is also to be understood that where the tracks B B are arranged upon different parallel streets the rails are connected together in many cities by transverse tracks running upon the crossing streets, and in addition to this may be connected at intervals with connecting-wires, as at $b$, of any suitable length, and protected, if desired, in any suitable manner by proper insulation at points intermediate of the two tracks, so as to prevent the current leaving the said conductor at any point between the tracks. This would be advantageous where the parallel tracks were situated at considerable distance apart.

While I have shown the positive and negative conductors as suspended and adapted to use with the ordinary well-known trolley type of railway, it is to be understood that my invention is equally adapted to any and all systems—that is to say, those in which the working conductor or conductors are arranged above the car, on the surface of the roadway in a conduit, or in any other manner heretofore well known. While it is probable that the rails of the track will alone be the practical means of connecting the two cars of the respective tracks electrically into circuit, it is to be borne in mind that the electric conductors indicated by the said tracks may be any other conductors with which the cars make electrical connection while traveling, and so far as the electrical part of my invention is concerned the tracks may be simply looked upon as electrical conductors. I wish it to be understood, therefore, that in the claims of this application wherever the rails are made elements of the claim said word in its meaning to include any conductors adapted to perform the same electrical function as the rails.

What I claim as new, and desire to secure by Letters Patent, is—

1. In an electric railway, the combination of two parallel tracks electrically connected together at close intervals in their length, a positive working conductor arranged parallel to one track, a negative working conductor arranged parallel to the other track, a source of electrical energy for supplying current of positive polarity to the positive conductor and a current of negative polarity to the negative conductor, positive and negative feeding-conductors interposed between the source of electrical energy and the positive and negative working conductors and respectively connecting therewith at places distant from the source of electrical energy, a conduit structure arranged underground for containing the supply-conductors in an insulated condition, means for supporting the positive and negative working conductors of the two tracks in an elevated position above the tracks, branch conductors connecting the positive and negative supply-conductors at intervals respectively with the positive and negative working conductors, and electrically-propelled cars traveling upon each of the railways each provided with an electric motor to propel it, a current-collecting device making traveling connection with the working conductor corresponding to its track, and a motor-circuit including the current-collecting device and the motor and connecting electrically with the track.

2. In an electric railway, the combination of two parallel tracks electrically connected together at close intervals in their length, a positive working conductor arranged parallel to one track, a negative working conductor arranged parallel to the other track, a source of electrical energy for supplying current of positive polarity to the positive conductor and a current of negative polarity to the negative conductor, electrically-propelled cars traveling upon each of the railways each provided with an electric motor to propel it, a current-collecting device making traveling connection with the working conductor corresponding to its track, a motor-circuit including the current-collecting device and the motor and connecting electrically with the track, and electromagnetic devices arranged at one or more places along the railway for automatically connecting the track-circuit with either the positive or negative working conductor or their supply-conductors whereby the current from either working conductor by a passing car may have a free passage formed to the working conductor of opposite polarity.

3. In an electric railway, the combination of two parallel tracks electrically connected together at close intervals in their length, a positive working conductor arranged parallel to one track, a negative working conductor arranged parallel to the other track, a source of electrical energy for supplying current of positive polarity to the positive conductor and a current of negative polarity to the negative conductor, electrically-propelled cars traveling upon each of the railways each provided with an electric motor to propel it, a current-collecting device making traveling connection with the working conductor corresponding to its track, a motor-circuit including the current-collecting device and the motor and connecting electrically with the track, electromagnetic devices arranged at one or more places along the railway for automatically connecting the circuit with either the positive or negative working conductor or their supply-conductors whereby the current delivered to the rails through either working conductor by a passing car may have a free passage formed to the working conductor of opposite polarity said devices consisting of an electromagnet comprising a high-resistance coil permanently in the circuit, a low-resistance coil intermittently in circuit, and a spring-actuated armature to open or close the circuit through the low-resistance coil.

4. In an electric railway, the combination of poles arranged upon opposite sides of the streets, two parallel railway-tracks arranged in the street, a span-wire formed in two parts insulated from each other and connected at its ends to the poles, a positive working conductor suspended from one of the sections of the span-wire and above one of the tracks, and a negative working conductor suspended from the other section of the span-wire and arranged above the other track.

5. In an electric railway, the combination of poles arranged upon opposite sides of the streets, two parallel electrically-continuous railway-tracks arranged in the street and connected at intervals in their length, a span-wire formed in two parts insulated from each other and connected at its ends to the poles, a positive working conductor suspended from one of the sections of the span-wire and above one of the tracks, a negative working conductor suspended from the other section of the span-wire and arranged above the other track, and a car upon each track provided with a trolley device for making connection with the working conductor corresponding to the track on which its car runs, an electric motor to propel the car, a motor-circuit on the car connecting the trolley device with the rails and including the motor, and independent means on each car for controlling the current passing to the motors.

6. In an electric railway, the combination of poles arranged upon opposite sides of the streets, two parallel railway-tracks arranged in the street and electrically connected at intervals in their length, a span-wire formed in two parts insulated from each other and connected at its ends to the poles, a positive working conductor suspended from one of the sections of the span-wire and above one of the tracks, a negative working conductor suspended from the other section of the span-wire and arranged above the other track, a railway-car upon each track provided with the trolley device for making connection with the working conductor corresponding to the track on which the car runs, an electric motor to propel the car, a motor-circuit on the car connecting the trolley device with the rails and including the motor, independent means on each car for controlling the current passing to the motor, and guard-wires also suspended from the poles above the working conductors and at a higher elevation so as to prevent any possibility of a falling wire completing a circuit across the positive and negative working conductors.

7. The herein-described method of operating parallel railways by electricity which consists in supplying to electrically-propelled vehicles upon the two railways currents of opposite polarity from a stationary source of electrical energy and immediately uniting the said currents after energizing the motors on said cars in a common circuit in electrical connection with the earth whereby said currents do not traverse the earth parallel to the tracks for any material distance, and automatically supplying an increased current from a conductor of either track to the conductor of opposite polarity of the other track when a car is upon one track and not upon the other track.

In testimony of which invention I have hereunto set my hand.

R. M. HUNTER.

Witnesses:
ERNEST HOWARD HUNTER,
HELEN L. MOTHERWELL.